United States Patent [19]

Cook

[11] Patent Number: 5,281,652
[45] Date of Patent: Jan. 25, 1994

[54] EMULSIFIABLE LINEAR POLYETHYLENE COMPOSITIONS AND PROCESS FOR PREPARATION

[75] Inventor: Gregory A. Cook, Baton Rouge, La.

[73] Assignee: Eastman Kodak Company, Rochester, N.Y.

[21] Appl. No.: 632,780

[22] Filed: Dec. 24, 1990

[51] Int. Cl.$^5$ .................. C08L 5/01; C08L 91/06
[52] U.S. Cl. .................... 524/475; 524/275; 524/481; 524/487; 524/488
[58] Field of Search ............. 524/275, 487, 488, 475, 524/481

[56] References Cited

U.S. PATENT DOCUMENTS 3,660,336  5/1972  Gonta et al. ................. 524/488

FOREIGN PATENT DOCUMENTS 0296490 12/1988
1495938  5/1969  Fed. Rep. of Germany .
1323176  2/1963  France .
1050548 12/1966  United Kingdom .

OTHER PUBLICATIONS

Kirk–Othmer, Encyclopedia of Chemical Technology, Third Edition, vol. 16, pp. 385–401 (1981).

Primary Examiner—Paul R. Michl
Assistant Examiner—Tae H. Yoon
Attorney, Agent, or Firm—Mark A. Montgomery; William P. Heath, Jr.

[57] ABSTRACT

Emulsifiable linear polyethylene compositions which exhibit good hardness and color characteristics can be obtained by oxidizing a blend of about 90 to 60% by weight of either linear low density polyethylene or high density polyethylene and about 10 to 40% by weight paraffin wax to an acid number of 12 to 30 mg KOH/g. The water emulsions obtained from the emulsifiable polyethylene compositions are useful as textile lubricants and fruit coatings.

16 Claims, No Drawings

EMULSIFIABLE LINEAR POLYETHYLENE COMPOSITIONS AND PROCESS FOR PREPARATION

BACKGROUND OF THE INVENTION

1. Field of the Invention:

The present invention relates to novel emulsifiable linear polyethylene containing compositions which possess good color characteristics, such as high light transmittance, high density, and low penetration hardness values. The present invention also relates to a process for the production of such emulsifiable linear polyethylene compositions and the emulsions prepared from such emulsifiable linear polyethylene compositions.

2. Discussion of the Background:

Water emulsifiable polyethylene waxes are widely used as self-polishing waxes in commercial applications. These waxes are relatively easy to use, are inexpensive, and provide good results. The waxes, in addition to being used in self-polishing wax formulations for floor polish applications, are also useful in formulating textile finishes, paper coatings, and the like. However, for applications such as textile lubricants and fruit coatings, waxes characterized by having high densities and low penetration hardness values as well as good color characteristics are desired.

One method for producing emulsifiable polyethylene compositions involves a two-step procedure. The polyethylene is first thermally degraded and then oxidized. However, the presence of catalyst residues, such as Ti, Ca, Al, and Cl, results in a discoloration of the polyethylene during the thermal degradation step. Thus, emulsifiable polyethylenes produced by this process do not possess good color characteristics and are not suitable for use as textile lubricants and fruit coatings.

A process for oxidizing blends of specific polyethylene components and a specific microcrystalline wax is disclosed in U.S. Pat. No. 2,879,239. The products produced by the process are said to be especially valuable for the preparation of emulsions which, when spread on a surface, leave hard, tough films having a high gloss.

U.S. Pat. No. 4,632,955 discloses emulsifiable polyethylene paraffin blend compositions prepared by oxidizing a mixture of: (1) low density polyethylene (LDPE); (2) low density polyethylene wax; and (3) paraffin wax. By first blending the LDPE with paraffin wax, the initial viscosity of the polyethylene is lowered, and the thermal degradation step may be omitted. This method provides a savings in energy and a product with better color characteristics. However, the emulsifiable LDPE compositions possess low densities and high penetration hardness values and are, thus, unsuitable for use as textile lubricants or fruit coatings.

Thus, there is a need for emulsifiable polyethylene compositions which possess good color characteristics, high densities, and low penetration hardness values.

SUMMARY OF THE INVENTION

Accordingly, one object of this invention is to provide novel emulsifiable polyethylene compositions which possess good color characteristics, high densities, and low penetration hardness values.

It is another object of the present invention to provide a process for the preparation of emulsifiable polyethylene compositions which possess good color characteristics, high densities, and low penetration hardness values.

It is a further object of the present invention to provide water-based emulsions of emulsifiable polyethylene compositions which possess high light transmittance, good color characteristics, high densities, and low penetration hardness values.

These and other objects which will be come apparent during the following description of the present invention have been achieved by the oxidation of a blend of (a) about 90 to 60% by weight of either linear low density polyethylene (LLDPE) or high density polyethylene (HDPE) and (b) about 10 to 40% by weight of paraffin wax, to an acid number of about 12 to 30 milligrams KOH/gm.

DETAILED DESCRIPTION OF THE PREFERRED EMBODIMENTS

The emulsifiable polyethylene compositions produced by the present invention have high densities and low penetration hardness values. These emulsifiable polyethylene compositions have hardness characteristics of linear polyethylenes despite the presence of the soft paraffin wax. These oxidized polyethylene compositions are prepared without the need of thermal degradation step and thus have good color characteristics.

The LLDPE useful in this invention can have densities between about 0.931 g/cc and 0.940 g/cc and melt indices of no lower than about 55 dg/min preferably between about 75 and 125 dg/min. The LLDPE can be prepared by any conventional process, such as the polymerization of high purity polymerization-grade ethylene. The polymerization can be carried out in the gas-phase utilizing either a fluid bed or stirred bed. Alternatively, the polymerization can be carried out in the liquid-phase using either a slurry or solution. Further details for the preparation of LLDPE can be found, e.g., in Kirk-Othmer, "Encyclopedia of Chemical Technology", Volume 16, John Wiley, pp. 388–394 (1981).

Suitable HDPE can have densities between about 0.960 g/cc and 0.975 g/cc and melt indices of no lower than about 55 dg/min and preferably between about 75 and 125 dg/min. The HDPE used in the present invention can be produced by any conventional process, such as the Solvay process. Again, the polymerization can be carried out in either the gas-phase or liquid-phase, and further details can be found in Kirk-Othmer, "Encyclopedia of Chemical Technology", Volume 16, John Wiley, pp. 428–430 (1981).

Suitable LLDPE and HDPE contain less than about 0.03% by weight of color imparting impurities such as ash preferably less than about 0.02% by weight. If the impurity content is above 0.03% by weight, the composition will have poor color characteristics.

The paraffin waxes useful in this invention are those having a melting point between about 40° C. and 75° C., preferably between about 52° C. and 64° C., which are obtained during petroleum refining processes. Such waxes are well known in the art and are readily commercially available.

The emulsifiable linear polyethylene compositions of the present invention preferably contain: (a) about 85 to 70% by weight LLDPE or HDPE and (b) about 15 to 30% by weight paraffin wax, based on the total weight of the composition. The emulsifiable linear polyethylene compositions of the present invention more preferably contain less than about 25% by weight paraffin wax.

The polyethylene and paraffin wax are blended by any suitable means known in the art such as for example, heated tumblers, blenders, extruders and the like. The molten blend can then be oxidized in any suitable apparatus by passing an oxygen containing gas such as air, oxygen, and inert gas and oxygen mixtures, into the blend at a temperature of less than about 135° C. to 190° C., preferably from 150° C. to 175° C., to obtain an oxidized blend having the desired acid number. The emulsifiable polyethylene compositions of the present invention are preferably oxidized to have an acid number from 15 milligrams KOH/gm to 24 milligrams KOH/gm. The oxidized blend can, if desired, be stabilized with conventional commercially available stabilizers.

The oxidized blends of the present invention are readily emulsifiable by processes well known in the art, such as water-to-wax and wax-to-water techniques. These emulsions are generally prepared using well known emulsifiers or surfactants and a base, water and the oxidized blend. These emulsions preferably contain between about 50 and 95% by weight water and between about 5 and 50% by weight of solids. The emulsion also preferably contains between about 4 and 40% by weight of the polyethylene composition. These emulsions more preferably contain between about 60 and 80% by weight water.

The emulsifiable polyethylene compositions prepared according to the present invention have a Gardner color of no higher than from about 2 preferably no higher than about 1 and a penetration hardness of less than or equal to 1 dmm. The compositions of the present invention provide excellent nonionic emulsions having light transmittance values of at least 60% and are useful in textile coatings and fruit coatings.

Other features of the present invention will become apparent in the course of the following descriptions of exemplary embodiments which are given for illustration of the invention and are not intended to be limiting thereof.

EXAMPLES

Oxidation

Oxidation of the blends was generally conducted as described below:

Atmospheric Pressure Cooxidation was conducted as follows. A 500-ml, four-neck flask was equipped with a Teflon blade stirrer, thermocouple, and spargetube and charged with 200 grams of the appropriate blend. The contents were heated to 150° C. and oxygen was passed through the vigorously stirred molten wax at a rate of 1.7 liters per minute. The acid number was monitored throughout the oxidation, and the reaction was terminated near a target acid number of about 16 to 17.

Pressure Cooxidation was conducted as follows. A 2-liter Parr autoclave was charged with 700 grams of the appropriate blend, and the contents were heated to 150° C. under 30 psig nitrogen. The molten wax was stirred at 800 rpm, and the inlet gas was switched from nitrogen to compressed air. Oxidation was carried out at 150° C. to 175° C., 100 to 175 psig, and 2.5 to 3.0 liters per minute air flow. The acid number was measured periodically during the course of the cooxidation by collecting a small portion of the wax through a bottom drain valve. Upon reaching a target acid number near about 16 to 17, the product was dumped into a silicone lined box via the bottom drain valve.

Emulsification

The emulsifiable polyethylene compositions prepared in the examples given below can be converted to water-emulsions by conventional wax-to-water methods. A typical nonionic emulsion is as follows. A 300.ml Parr autoclave is charged with 40 grams wax, 12 grams nonionic surfactant (Igepal CO-630), 1 gram potassium hydroxide, and sufficient demineralized water to make a 30 percent solids emulsion. The amount of KOH varies with the wax acid number and is calculated using the equation below:

$$KOH, Grams = Acid\ Number \times 0.0465.$$

The contents of the autoclave are stirred and heated to from 140° C. to 145° C. resulting in a pressure rise to approximately 120 psi. Stirring is continued for 45 minutes at 140° C. The heating mantle is removed, and the autoclave is immersed in an ice-water bath with continued agitation. Cooling of the emulsion to room temperature is achieved within 10 minutes.

EXAMPLES 1-3 AND COMPARATIVE EXAMPLES 1-4

Emulsifiable LLDPE compositions were prepared using the ingredients, amounts, and oxidation conditions given in Table 1. The physical properties of the resulting emulsifiable LLDPE compositions for Examples 1-3 and Comparative Examples 1-4 are presented in Table 2.

TABLE 1

| Example | LLDPE | Composition | | | | Oxidation Conditions | | | |
|---|---|---|---|---|---|---|---|---|---|
| | | Melt Index of LLDPE | Density of LLDPE | Paraffin Wax* | LLDPE:Wax | Initial Temp(°C.) | Temp after 1 Hr (°C.) | Pressure | Residence Time (min) |
| Example 1 | XD-61501.02[a] | 85 | 0.935 | SW100 | 80:20 | 175 | 150 | 1 atm | 200 |
| Example 2 | XD-61501.02[a] | 85 | 0.935 | SW100 | 80:20 | 150 | 150 | 100 psi | 362 |
| Example 3 | XD-61501.02[a] | 85 | 0.935 | SW100 | 85:15 | 165 | 150 | 100 psi | 221 |
| Comparative Example 1 | Sclair 2316[b] | 59 | 0.935 | SW100 | 80:20 | 175 | 150 | 1 atm | 270 |
| Comparative Example 2 | Sclair 2316[b] | 59 | 0.935 | SW100 | 80:20 | 150 | 150 | 100 psi | 202 |
| Comparative Example 3 | GRSN-7147[c] | 42 | 0.929 | SW100 | 75:25 | 175 | 150 | 100 psi | 210 |
| Comparative Example 4 | Lotrex[d] MW 1210 | 25 | 0.940 | SW100 | 75:25 | 175 | 175 | 1 atm | 365 |

[a]Produced by Dow Chemical having octene comonomer.
[b]Produced by DuPont having butene comonomer and contains an unusually large amount of ash.
[c]Produced by Union Carbide having butene comonomer.
[d]Produced by CdF Chimie having butene comonomer.

TABLE 2

| Example | Properties | | | | |
|---|---|---|---|---|---|
| | Acid Number (mg KOH/g) | Viscosity (125° C., cp) | Penetration Hardness (dmm) | Density (g/cc) | Gardner Color |
| Example 1 | 18.1 | 416 | 1.0 | 0.954 | 1 |
| Example 2 | 21.2 | 290 | 1.0 | 0.956 | 1 |
| Example 3 | 16.1 | 725 | <0.1 | 0.954 | 1 |
| Comparative Example 1 | 17.6 | 1200 | 0.5 | 0.955 | 6 |
| Comparative Example 2 | 16.0 | 761 | 0.6 | 0.952 | 2 |
| Comparative Example 3 | 16.5 | 257 | 2.7 | 0.946 | 1 |
| Comparative Example 4 | 15.9 | 352 | 1.4 | 0.954 | 1 |

As can be seen from the results presented in Table 2, the emulsifiable LLDPE compositions of the present invention all display good color and penetration hardness, while the emulsifiable LLDPE compositions prepared not in accordance with the present method exhibit either poor hardness properties or color.

Thus, the compositions of Examples 1–3 all possess a high density, a low penetration hardness value, and a Gardner color of 1. In contrast, the compositions of Comparative Examples 1 and 2, which are prepared from LLDPE containing a large amount of ash, display Gardner colors of 6 and 2, respectively, and those of Comparative Examples 3 and 4, which are prepared from LLDPE with low melt indices, exhibit penetration hardness values greater than 1 dmm.

EXAMPLES 4 AND 5 AND COMPARATIVE EXAMPLES 5 AND 6

Emulsifiable HDPE compositions were prepared as described in Table 3, and the properties of the resulting compositions are given in Table 4.

TABLE 3

| Example | Composition | | | | | Oxidation Conditions | | | |
|---|---|---|---|---|---|---|---|---|---|
| | HDPE (Comonomer) | Melt Index of HDPE | Density of HDPE | Paraffin Wax* | HDPE:Wax | Initial Temp(°C.) | Temp after 1 hr (°C.) | Pressure | Residence Time (min) |
| Example 4 | XD-5320.15(a) | 80 | 0.96 | SW100 | 80:20 | 175 | 150 | 1 atm | 313 |
| Example 5 | XD-5320.15(a) | 80 | 0.96 | SW100 | 80:20 | 150 | 150 | 100 psi | 399 |
| Comparative Example 5 | Norsoplast(b) MY 1610 | 16 | 0.957 | M150 | 50:50 | 175 | 150 | 100 psi | 198 |
| Comparative Example 6 | Norsoplast(b) MY 1610 | 16 | 0.957 | SW100 | 60:40 | 175 | 150 | 100 psi | 206 |

(a)Produced by Dow Chemical.
(b)Produced by CdF Chimie.

TABLE 4

| Example | Properties | | | | |
|---|---|---|---|---|---|
| | Acid Number (mg KOH/g) | Viscosity (125° C., cp) | Penetration Hardness (dmm) | Density (g/cc) | Gardner Color |
| Example 4 | 20.1 | 407 | <0.1 | 0.972 | 1 |
| Example 5 | 21.5 | 255 | <0.1 | 0.973 | 1 |
| Comparative Example 5 | 16.7 | 82.5 | 3.5 | 0.953 | 1 |
| Comparative Example 6 | 17.5 | 126 | 2.0 | 0.951 | 1 |

Again, as can be seen from the results presented in Table 4, emulsifiable HDPE compositions prepared according to the present invention display superior penetration hardness values as compared to those of the comparative examples.

Obviously, numerous modifications and variations of the present invention are possible in light of the above teachings. It is therefore to be understood that within the scope of the appended claims, the invention may be practiced otherwise than as specifically described herein.

I claim:

1. An emulsifiable polyethylene composition comprising:
    (a) about 90 to about 60% by weight, based on the total weight of the composition, of at least one polyethylene selected from the group consisting of (1) linear low density polyethylene having a melt index no lower than about 55 dg/min and a density between about 0.931 and about 0.940 g/cc and (2) high density polyethylene having a melt index no lower than about 55 dg/min and a density between about 0.960 and about 0.975 g/cc, and
    (b) about 10 to about 40% by weight, based on the total weight of said composition of paraffin wax; wherein said emulsifiable polyethylene composition has been oxidized to an acid number of 12 to 30 mg KOH/g.

2. The emulsifiable polyethylene composition according to claim 1, wherein said polyethylene has a melt index between about 75 and about 125 dg/min.

3. The emulsifiable polyethylene composition according to claim 1, wherein said composition has a penetration hardness value no higher than about 1 dmm and a gardner color no higher than about 2.

4. The emulsifiable polyethylene composition according to claim 3, wherein said composition contains less than 0.03% by weight ash and has a gardner color no higher than about 1.

5. The emulsifiable polyethylene composition according to claim 1, wherein said paraffin wax is present in the composition in an amount between about 15 and about 30% by weight and has a melting point between about 40° C. and about 75° C.

6. The emulsifiable polyethylene composition according to claim 5 wherein said paraffin wax has a melting point of about 52° C. to about 64° C.

7. A water-polyethylene emulsion comprising about 50 to about 95% by weight water based on the total weight of said emulsion; and an emulsifiable polyethylene composition, comprising:
    (a) about 90 to about 60% by weight, based on the total weight of the composition of at least one polyethylene selected from the group consisting of (1) linear low density polyethylene having a melt index between about 55 and about 125 dg/min and a density between about 0.931 and about 0.940 g/cc and (2) high density polyethylene having a melt index between about 55 and about 125 dg/min and a density between about 0.960 and about 0.975 g/cc and (b) about 10 to about 40% by weight, based on the total weight of said composition, of paraffin wax;

wherein said emulsifiable polyethylene composition has been oxidized to an acid number of 12 to 30 mg KOH/g.

8. The emulsion according to claim 7 wherein the emulsion contains between about 60 and about 80% by weight water and between about 20 to about 40% by weight solids.

9. The emulsion according to claim 7 wherein said paraffin wax has a melting point between about 40° C. and about 75° C.

10. The emulsion according to claim 7 wherein the light transmittance of the emulsion is at least 60%.

11. A process for preparing an emulsifiable polyethylene composition comprising:

(i) blending (a) about 90 to about 60% by weight, based on the total weight of the composition, of at least one polyethylene selected from the group consisting of (1) linear low density polyethylene having a melt index no lower than about 55 dg/min and a density between about 0.931 and about 0.940 g/cc and (2) high density polyethylene having a melt index no lower than about 55 dg/min and a density between about 0.960 and about 0.975 g/cc, and (b) about 10 to about 40% by weight, based on the total weight of said composition of paraffin wax, to give a polyethylene-paraffin wax blend; and (ii) oxidizing said polyethylene-paraffin wax blend to give an emulsifiable polyethylene composition having an acid number between 12 and 30 mg KOH/g.

12. The process according to claim 11 wherein oxidizing Step (ii) utilizes an oxygen containing gas as an oxidant.

13. The process according to claim 12 wherein said oxidizing Step (ii) is conducted at a temperature from about 135° C. to about 190° C.

14. The process according to claim 13 wherein said oxidizing step is conducted at a temperature from about 150° C. to about 175° C.

15. The emulsifiable polyethylene composition according to claim 1 wherein said polyethylene is a linear low density polyethylene.

16. The emulsifiable polyethylene composition according to claim 1 wherein said polyethylene is a high density polyethylene.

* * * * *